US008159998B2

United States Patent
Wilson et al.

(10) Patent No.: US 8,159,998 B2
(45) Date of Patent: Apr. 17, 2012

(54) METHOD AND APPARATUS FOR IMPROVING A TRANSMISSION SIGNAL CHARACTERISTIC OF A DOWNLINK SIGNAL IN A TIME DIVISION MULTIPLE ACCESS WIRELESS COMMUNICATION SYSTEM

(75) Inventors: Keith S. Wilson, Bishops Stortford (GB); Martin Smith, Chelmsford (GB)

(73) Assignee: Rockstar BIDCO LP, New York, NY (US)

(*) Notice: Subject to any disclaimer, the term of this patent is extended or adjusted under 35 U.S.C. 154(b) by 3324 days.

(21) Appl. No.: 10/330,944

(22) Filed: Dec. 27, 2002

(65) Prior Publication Data
US 2004/0125773 A1    Jul. 1, 2004

(51) Int. Cl.
*H04J 3/08*   (2006.01)
*H04J 3/00*   (2006.01)
*H04J 3/16*   (2006.01)
*H04B 7/185*  (2006.01)
*H04B 7/212*  (2006.01)
*H04B 15/00*  (2006.01)

(52) U.S. Cl. ........ 370/326; 370/318; 370/337; 370/347; 370/437; 455/63.1

(58) Field of Classification Search ............ None
See application file for complete search history.

(56) References Cited

U.S. PATENT DOCUMENTS

| | | | | |
|---|---|---|---|---|
| 5,594,946 A | * | 1/1997 | Menich et al. | 455/522 |
| 6,301,478 B1 | | 10/2001 | Wallstedt et al. | |
| 6,490,262 B1 | * | 12/2002 | Hogger | 370/337 |
| 6,591,109 B2 | * | 7/2003 | Pan | 455/452.1 |
| 6,771,628 B1 | * | 8/2004 | Soderkvist et al. | 370/337 |
| 6,882,849 B2 | * | 4/2005 | Pan | 455/452.1 |
| 6,925,303 B2 | * | 8/2005 | Mohebbi et al. | 455/442 |
| 7,116,983 B2 | * | 10/2006 | Lan et al. | 455/452.2 |
| 7,643,547 B2 | * | 1/2010 | Ishii et al. | 375/227 |
| 2002/0015393 A1 | * | 2/2002 | Pan et al. | 370/335 |
| 2003/0202490 A1 | * | 10/2003 | Gunnarsson et al. | 370/332 |
| 2004/0100920 A1 | * | 5/2004 | Ball et al. | 370/318 |

FOREIGN PATENT DOCUMENTS

| | | |
|---|---|---|
| EP | 0654952 A2 | 5/1995 |
| EP | 1146760 A2 | 10/2001 |
| WO | WO 00/28758 | 5/2000 |

\* cited by examiner

*Primary Examiner* — Warner Wong
(74) *Attorney, Agent, or Firm* — Barnes & Thornburg LLP

(57) ABSTRACT

The invention relates to improving the quality of a received downlink signal in a time division multiple access wireless cellular communications network. The method of the invention comprises measuring a signal quality characteristic at a user equipment and comparing this to a threshold to determine if a desired signal quality level exists. It so then a certain level or type of service on the downlink can be effected. It not, the method comprises identifying an interferer signal or signals and removing at least one of such interferer signals by arranging for it to either not be transmitted on the same TDMA timeslot as the downlink signal or to be transmitted at a lower power, for example, in said timeslot.

18 Claims, 1 Drawing Sheet

METHOD AND APPARATUS FOR IMPROVING A TRANSMISSION SIGNAL CHARACTERISTIC OF A DOWNLINK SIGNAL IN A TIME DIVISION MULTIPLE ACCESS WIRELESS COMMUNICATION SYSTEM

The present invention relates to a method and apparatus for improving a transmission signal characteristic of a downlink signal received at a user equipment in a time division multiple access (TDMA) wireless communication system and particularly but not exclusively to the utilisation of such method and apparatus in a TDMA cellular wireless communications system.

BACKGROUND

A problem is encountered in cellular wireless communications networks in which user equipments receiving downlink signals at locations towards the outer edges of the networks' cells may experience poor carrier signal to interference signal power ratios (C/I). One consequence of this is that it may not be possible to provide the same levels and types of services, particularly broadband data services, to such user equipments than is possible for user equipments located much closer to system signal sources such as base stations. Alternatively, whilst similar services may be delivered to user equipments located in the outer margins of the cells, the service bit rates for such services may have to be considerably reduced which means that the service being provided is delivered at a much slower rate, is delivered without all the normally available features or is at a greater risk of interruption or disconnection.

In a cellular wireless communications network with a packet switched time division multiple access (TDMA) downlink, one solution that has been attempted to overcome the abovementioned problem is a scheduling based solution in which the number of TDMA time slots allotted for transmissions to edge of cell user equipments is increased. Whilst it is intuitive that such a scheduling solution will improve the ability of the network to provide edge of cell user equipments with the levels and types of services available to user equipments closer to base stations, for example, experience indicates that, whilst service coverage over the cells of the network is improved, the capacity of the network for delivering services to all user equipments is substantially reduced.

OBJECTS OF THE INVENTION

An object of the invention is to provide a method of improving a signal characteristic of a downlink signal received by an edge of cell user equipment in a TDMA cellular wireless communication system.

SUMMARY OF THE INVENTION

The present invention proposes improving the C/I of edge of cell user equipments by switching off the base station downlink signal transmissions of the strongest downlink signal interferers during the time slots employed for transmitting downlink signals to edge of cell user equipments. In this way, the edge of cell user equipments see a greatly reduced level of downlink signal interference which leads to a greatly increased potential data throughput for said user equipments thus enabling the same levels and types of services to be delivered to such user equipments as would be the case if they were located closer to their respective base stations. The proposed solution offered by the present invention does involve a trade-off between a lowering of the capacity of the network since some downlink signals are prevented from being transmitted in certain TDMA time slots. This will lead to the network being able to serve less user equipments, but experience shows that this reduction in capacity of the network is not as great as is the case where the abovementioned scheduling based solution is employed and yet achieves at least as good, if not better, user equipment coverage.

A first aspect of the present invention provides a method of improving a signal characteristic of a downlink signal received on a user equipment in a time division multiple access ((TDMA) wireless communication system, comprising the steps of:

at a user equipment:
A. receiving a desired downlink signal from a signal source in a predetermined TDMA time slot;
B. receiving at least one other signal in said same predetermined TDMA time slot; and
C. measuring a signal quality characteristic of said desired downlink signal;
the method comprising the further steps of:
D. comparing said measured signal quality characteristic with a threshold; and
E. where it is determined from said comparison of said measured signal quality characteristic with said threshold that the reception by the user equipment of said at least one other signal has contributed to the measured signal quality characteristic of the desired downlink signal not meeting the threshold, arranging for the source of said at least one other signal to change a transmission signal characteristic of said at least one other signal.

A second aspect of the present invention provides a timed division multiple access (TDMA) wireless communication system, comprising:

a user equipment operable to receive a desired downlink signal from a signal source in a predetermined TDMA time slot, to receive at least one other signal in said same predetermined TDMA time slot and to measure a signal quality characteristic of said desired downlink signal, the system further comprising means for comparing said measured signal quality characteristic with a threshold; and, where it is determined from said comparison of said measured signal quality characteristic with said threshold that the reception by the user equipment of said at least one other signal has contributed to the measured signal quality characteristic of the desired downlink signal not meeting the threshold, means for arranging for a source of said at least one other signal to change a transmission signal characteristic of said at least one other signal.

A third aspect a user equipment for a TDMA wireless communications system, comprising:

a user equipment operable to receive a desired downlink signal from a signal source in a predetermined TDMA time slot, to receive at least one other signal in said same predetermined TDMA time slot and to measure a signal quality characteristic of said desired downlink signal, the system further comprising means for comparing said measured signal quality characteristic with a threshold; and, where it is determined from said comparison of said measured signal quality characteristic with said threshold that the reception by the user equipment of said at least one other signal has contributed to the measured signal quality characteristic of the desired downlink signal not meeting the threshold, means for arranging for a source of said at least one other signal to change a transmission signal characteristic of said at least one other signal.

BRIEF DESCRIPTION OF THE DRAWINGS

In order to show how the invention may be carried into effect, an embodiment of the invention will now be described below by way of example only and with reference to the accompanying figures in which.

A DETAILED DESCRIPTION OF THE INVENTION

The best mode of the invention will now be described with reference to the accompanying figures.

Figure 1:
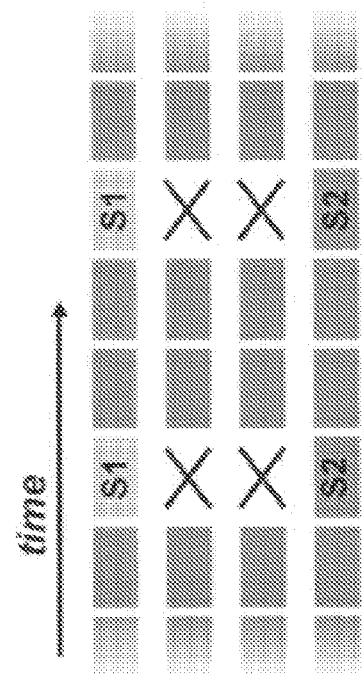
FIG. 1 is a schematic representation of a TDMA cellular wireless communications network.

FIG. 1 is a schematic representation of a cellular wireless communications network. The network comprises a plurality of contiguous cells 1 to 7, each cell being served by a respective base station 8 to 14 which each comprise a downlink signal source for user equipments 15 located in their respective cells. For ease of convenience, the cells 1 to 7 are schematically represented as being hexagonal in coverage area and only one user equipment is shown as being located towards an edge of the cell denoted 1 adjacent to the cell denoted as 4. It will be understood that each cell will be occupied by a plurality of user equipments and that the downlink signals transmitted by the various base stations 8 to 14 do not abruptly end at the boundaries of the cells but that such signals may be received by a user equipment located in a different cell.

The user equipment (UE) 15 depicted in FIG. 1 can be seen to be receiving a desired downlink signal S1 from a first signal source comprising base station 8 but is also receiving what might be termed undesired signals S2, S3 and S4 from other signal sources which, in the illustrated example, respectively comprise base stations 10, 11 and 12 of cells 3, 4 and 5. These signals are transmitted in the same TDMA time slot as the desired downlink signal S1. Signals S2, S3 and S4 can be considered as constituting interferer signals since reception of these signals by user UE15 will degrade the carrier signal to interfere signal power ratio (C/I) for desired downlink signal S1 received by UE15. Equally, signals S2, S3 and S4 could be considered as constituting noise signals with respect to desired downlink signal S1 and consequently the signal to noise ratio of the desired downlink signal S1 received by UE15 would also be degraded by the reception of these signals. In either case, it may not be possible for base station 8 to deliver the same levels and types of services, particularly data services, to UE15 located at the edge of cell 1 than would be the case if said user equipment were located much closer to base station 8. It will be understood that, at a location close to base station 8, the degrading effect on the desired downlink signal S1 received by the user equipment caused by interferer signals S2, S3 and S4 would be greatly diminished and possibly of negligible effect. However, for user equipments located towards the edge of cells, such signals can have a significant impact on reception quality of desired signals.

At UE15, a transmission signal quality characteristic such as the CIR, SNR, signal to noise and interference ratio (SNIR) or any commonly defined signal characteristic of the desired downlink signal is measured. This measurement of a signal quality characteristic of the desired downlink signal S1 can then be compared with a predetermined threshold. The threshold may be a value set by a network manager element (NE) 16 which determines whether a certain service or level of service can be efficiently supplied to a user equipment based on a comparison of the measured signal quality characteristic and the threshold. For example, if the CIR value calculated for the desired downlink signal S1 by UE15 is above a certain value then communication of this fact to the NE16 by the UE15 will allow the NE16 to determine that it can provide a requested type of data service or level of service, e.g. bit rate to UE15. It will be understood that the techniques for making such calculations and determining the ability to deliver services are known in the art.

The present invention recognises that it is possible to improve the transmission signal quality of a desired downlink signal for a user equipment located towards an edge of a cell if it is possible to reduce or remove the degrading effect on the desired downlink signal quality caused by interferer signals from other sources, or possibly from the same source where a cell is sectorised employing overlapping downlink antenna beams.

The present invention proposes a method of identifying the source or sources of interferer signals that have the most adverse impact on the downlink signal quality received by the user equipment and for arranging for said interferer signals to either not be transmitted at the same time as the desired downlink signal or for certain signal characteristics, for example power, of said interferer signals to be reduced if they are to be still transmitted at the same time as the downlink signal.

In FIG. 1 the NE16 which controls the base stations 8 to 14 and indirectly the user equipments 15 serviced by the base stations is shown linked to base station 9 only. It will be understood that NE16 will be connected to all base stations of the network. In the embodiment illustrated in FIG. 1, the UE15 having measured a signal quality characteristic of its desired downlink signal S1, communicates this to its base station 8 which in turn may communicate the measured signal quality characteristic to the NE16, The NE16 has knowledge of all signals being transmitted in all time slots of the TDMA scheme and, as such, can identify from its knowledge of the communications network topology which of the signals being transmitted in the same time slot as that being utilised by the desired downlink signal S1 to UE15 are candidates for being interferer signals with respect to said desired downlink signal S1. The NE16 can therefore, in response to a comparison of the measured signal quality characteristic of the desired downlink signal S1 communicated to it by UE15 via base station 8 with the threshold, determine if said signal quality characteristic meets a desired level of threshold and, if not, can arrange for candidate interfere signal sources to cease transmission. The NE16 can cause all candidate interferer signals to be prevented from being transmitted in the same TDMA time slot as the desired downlink signal S1. Alternatively, it can select each candidate interferer signal in some defined order and cause each in turn to be not transmitted to said time slot. Until such time as the UE15 communicates to the NE16 a measured signal quality characteristic that does now meet the desired threshold. Alternatively, the NE16 may choose to instruct the signal sources of the interferer signals to reduce the transmission power of said interferer signals rather than preventing them from continuing to be transmitted in the same TDMA time slot as the desired downlink signal S1. In this way, the effect of the interferer signals is mitigated such that the UE15 achieves a better signal quality reception of its desired downlink signal S1 than would have been the case had those steps not been taken to change a signal characteristic of the interferer signals.

Figure 2:
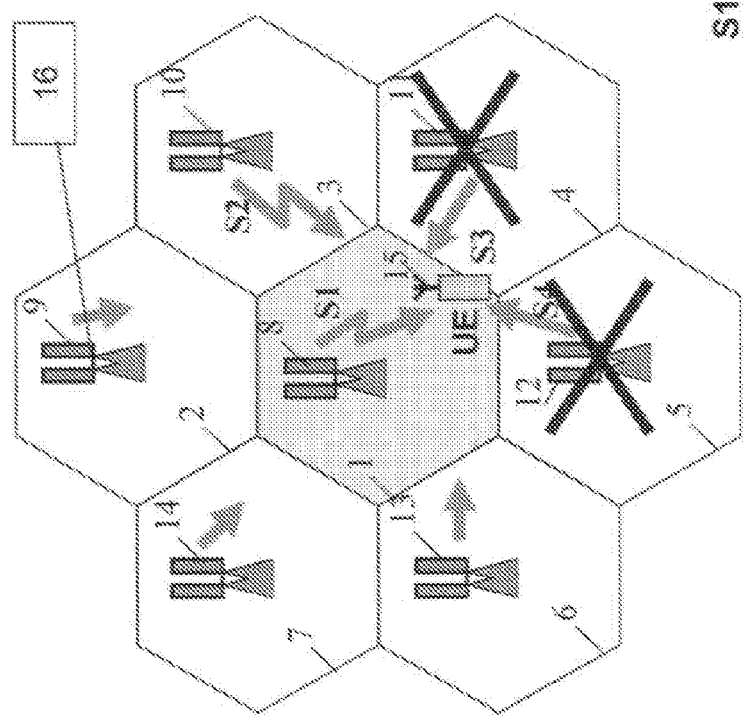
FIG. 2 illustrates a TDMA time slot allocation arrangement for a plurality of signal sources in the TDMA cellular wireless communication network of FIG. 1.

Reference is made to FIG. 2 which illustrates a TDMA time slot allocation for a desired downlink signal 81 and interferer signals S2, S3 and S4. In the example illustrated in FIG. 2, it can be seen that the NE 16 has instructed base stations 11 and 12 to cease transmission of interferer signals S3 and S4 during the same TDMA time slot as the desired downlink signal S1 but has allowed interferer signal S2 to continue to be transmitted during said same TDMA time slot. In this example, it has been determined that the prevention of transmission of interferer signals S3 and S4 during the same TDMA time slot as the desired downlink signal S1 is sufficient to improve the received signal quality by UE15 of desired downlink signal S1 to meet the desired threshold. Whilst this have the effect of reducing the overall capacity of the network, it does not result in all signals in the same time slot as the desired downlink signal being prevented from being transmitted and so the impact on the capacity of the network is not as deleterious as would at first be imagined. For example, the NE 16 will continue to allow other base stations such as 9, 13 and 14 of FIG. 1 to transmit downlink signals during the same TDMA time slot as desired downlink signal S1 since these are not considered to constitute interferer signals with respect to the reception by UE15 of desired downlink S1.

The description of how the NE 16 causes a number of candidate interferer signals to be prevented in them from being transmitted in the same TDMA time slot as that of the desired downlink signal S1 appears to comprise a random selection process. However, in a preferred embodiment of the invention, the UE 15 is arranged not only to measure a transmission signal quality characteristic of the desired downlink signal S1 but to also measure a signal characteristic for each interferer signal as a means of ranking said interferer signals as being the most adversely affecting to least adversely affecting interferer signal on the measured signal quality characteristic of the desired downlink signal S1. In this way, the NE 16 can select which of the interferer signal sources should first be caused to cease transmission of such signal in the TDMA time slot of the desired downlink signal S1. This process can be repeated until such time as the UE 15 has communicated to the NE 16 a measured signal quality characteristic that meets a desired level.

In most circumstances where the topology of a network is known and network characteristics relatively static, the value of threshold for comparing a measured signal quality characteristic of a desired downlink signal S1 may itself be a static (in time) value. However, in a mobile cellular wireless system where the sources of interferer signals may comprise sources other than base stations of adjacent cells and the network characteristics are changing dynamically, then the NE 16 may be arranged to dynamically vary the value of the threshold determining whether a certain service can be delivered to an edge of cell user equipment.

Whilst the NE 16 is described as making the comparison of the measured signal quality characteristic communicated to it by UE15 with the threshold, it will be understood that such comparison may be made at the base station 8 in a network where the NE 16 communicates to the base station 8 information concerning which other signal sources are transmitted on the same TDMA time slot as that used by base station 8 for the desired downlink signal S1 to UE15 and that base station 8 is able to communicate either via the NE 16 or directly with other base stations to instruct such stations to change a signal characteristic of an interferer signal. Alternatively, in a distributive wireless communication system in which user equipments can act as relay stations or even base stations, then the method described above might be fully implemented by a user equipment suitably arranged to be able to communicate with other user equipments such that said user equipments share knowledge as to which equipments are transmitting on certain TDMA time slots.

The invention claimed is:

1. A method of improving a signal characteristic of a downlink signal received at a user equipment in a time division multiple access (TDMA) wireless communications system, comprising the steps of:
   at a user equipment:
   A. receiving a desired downlink signal from a signal source in a predetermined TDMA time slot;
   B. receiving at least one other signal in said same predetermined TDMA time slot; and
   C. measuring a signal quality characteristic of said desired downlink signal;
   the method comprising the further steps of:
   D. comparing said measured signal quality characteristic with a threshold; and
   E. where it is determined from said comparison of said measured signal quality characteristic with said threshold that said at least one other signal has contributed to the measured signal quality characteristic of the desired downlink signal not meeting the threshold, arranging for the source of said at least one other signal to change a transmission signal characteristic of said at least one other signal so as to reduce interference to the downlink signal received at the user equipment.

2. A method according to claim 1, wherein the change in a transmission signal characteristic of said at least one other signal comprises arranging the source of said at least one other signal to prevent said at least one other signal being transmitted on the predetermined TDMA time slot of the desired downlink signal.

3. A method according to claim 1, wherein the change in a transmission signal characteristic of said at least one other signal comprises arranging for the source of said at least one other signal to reduce a transmission power of said at least one other signal.

4. A method according to any of claims 1 to 3, wherein steps A to E of said method of claim 1 are performed at the user equipment.

5. A method according to any of claims 1 to 3, wherein the steps A to C of the method of claim 1 are performed at said user equipment and the steps D and E of the method of claim 1 are performed at a base station comprising the source of the desired downlink signal.

6. A method according to any of claims 1 to 3, wherein the steps A to C of the method of claim 1 are performed at said user equipment and the steps D and E of the method of claim 1 are distributively performed by a base station that comprises the source of the desired downlink signal and a network management element controlling a number of base stations comprising the TDMA wireless communications system.

7. A method according to claim 1, wherein said threshold for comparing a measured transmission signal quality characteristic of the desired downlink signal has a static predetermined value.

8. A method according to claim 1, wherein said threshold for comparing a measured transmission signal quality characteristic of the desired downlink signal has a dynamically varying value.

9. A method according to claim 7 or claim 8, wherein the threshold comprises a value for one of a signal to noise ratio (SNR), a signal to interference and noise ratio (SNIR) and a carrier signal to interference ratio (CIR).

10. A method according to claim 1, wherein the user equipment receives a plurality of other signals in said predetermined TDMA time slot in addition to the desired downlink signal, the method comprising the further step of:

F. determining from a comparison of the measured signal quality characteristic of the desired downlink signal with a threshold which of said plurality of other signals most adversely affects the measured signal quality characteristic and arranging for a source of the determined most adversely affecting other signal to change a transmission signal.

11. A method according to claim 10, wherein step F of claim 10 includes determining in an order of most adversely affecting to least adversely affecting on said comparison of said measured transmission signal quality characteristic of the desired downlink signal with the threshold and arranging for the sources of said other signals in the order of the most adversely affecting to the least adversely affecting to sequentially change a transmission signal characteristic of said other signals, the sequential process being followed until such time that the comparison of the measured transmission signal quality characteristic of the desired downlink signal with the threshold meets a desired level.

12. A method according to claim 10 or claim 11, wherein the changes in the transmission signal characteristics of said most adversely affecting other signals comprises arranging for the sources of such signals to not transmit such signals in the predetermined TDMA time slot occupied by the desired downlink signal.

13. A time division multiple access (TDMA) wireless communication system, comprising:

a user equipment configured to receive a desired downlink signal from a signal source in a predetermined TDMA time slot, to receive at least one other signal in said same predetermined TDMA time slot and to measure a signal quality characteristic of said desired downlink signal, the system further comprising means for comparing said measured signal quality characteristic with a threshold; and, where it is determined from said comparison of said measured signal quality characteristic with said threshold that the reception by the user equipment of said at least one other signal has contributed to the measured signal quality characteristic of the desired downlink signal not meeting the threshold, means for arranging for a source of said at least one other signal to change a transmission signal characteristic of said at least one other signal so as to reduce interference to the desired downlink signal received at the user equipment.

14. A system according to claim 13, wherein the means for arranging for the source of said at least one other signal to change a transmission signal characteristic of said at least one other signal causes said at least one other signal not to be transmitted on the predetermined TDMA time slot of the desired downlink signal.

15. A system according to claim 13, wherein the means for arranging for the source of said at least one other signal to change a transmission signal characteristic of said at least one other signal causes the source of said at least one other signal to reduce a transmission power of said at least one other signal.

16. A system according to any of claims 13 to 15, wherein the user equipment includes the means for comparing said measured signal quality characteristic with a threshold and said means for arranging for a source of said at least one other signal to change a transmission signal characteristic of said at least one other signal.

17. A user equipment for a TDMA wireless communications system, comprising:

a user equipment configured to receive a desired downlink signal from a signal source in a predetermined TDMA time slot, to receive at least one other signal in said same predetermined TDMA time slot and to measure a signal quality characteristic of said desired downlink signal, the user equipment further comprising means for comparing said measured signal quality characteristic with a threshold; and, where it is determined from said comparison of said measured signal quality characteristic with said threshold that the reception by the user equipment of said at least one other signal has contributed to the measured signal quality characteristic of the desired downlink signal not meeting the threshold, means for arranging for a source of said at least one other signal to change a transmission signal characteristic of said at least one other signal so as to reduce interference to the desired downlink signal received at the user equipment.

18. A non-transient machine readable medium carrying a computer program to implement the method of claim 1.

* * * * *